G. M. KIEVLAN.
CURRENT MOTOR.
APPLICATION FILED NOV. 8, 1920.
1,406,031.
Patented Feb. 7, 1922.
5 SHEETS—SHEET 1
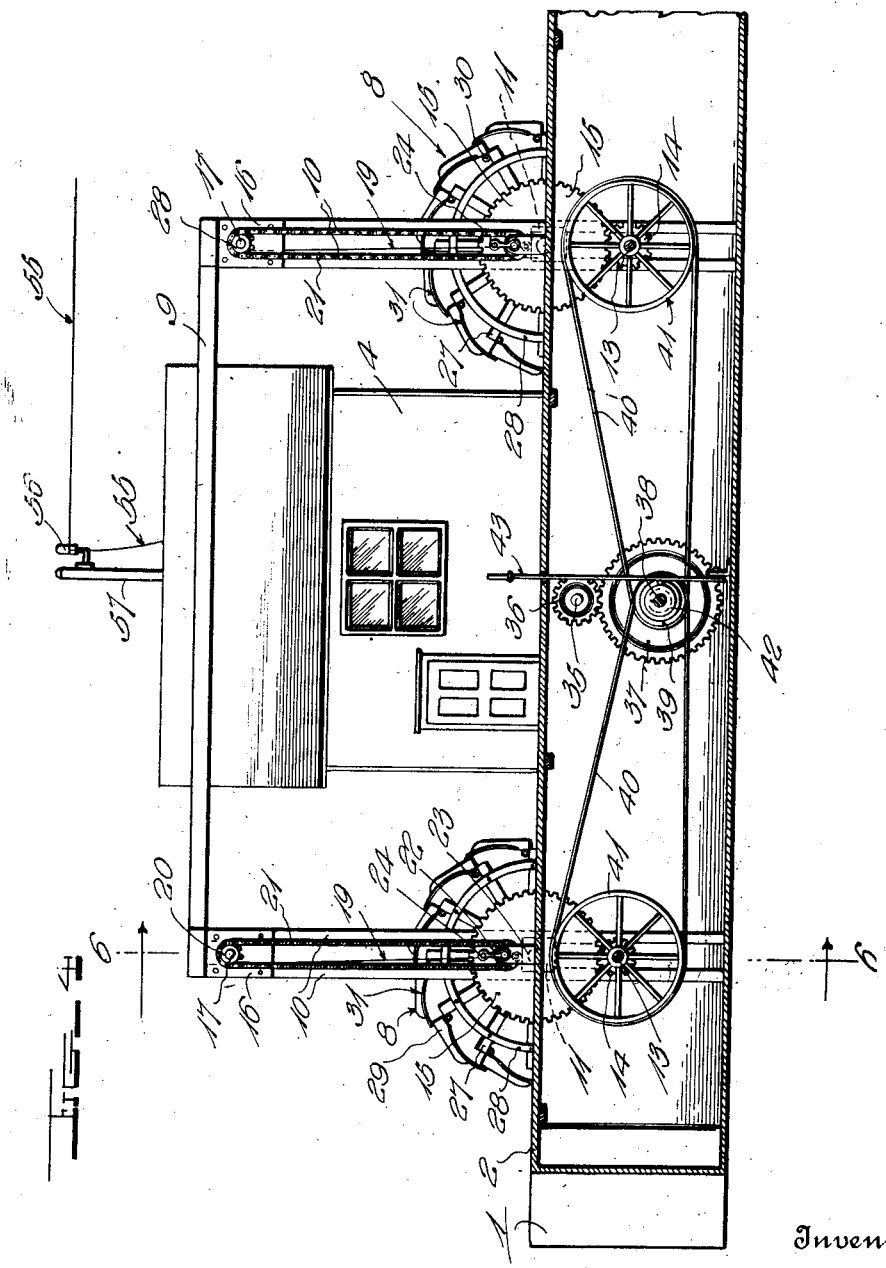
Inventor
G. M. Kievlan
By H. B. Wilson & Co.
Attorneys G. M. KIEVLAN.
CURRENT MOTOR.
APPLICATION FILED NOV. 8, 1920.
1,406,031.
Patented Feb. 7, 1922.
5 SHEETS—SHEET 4.
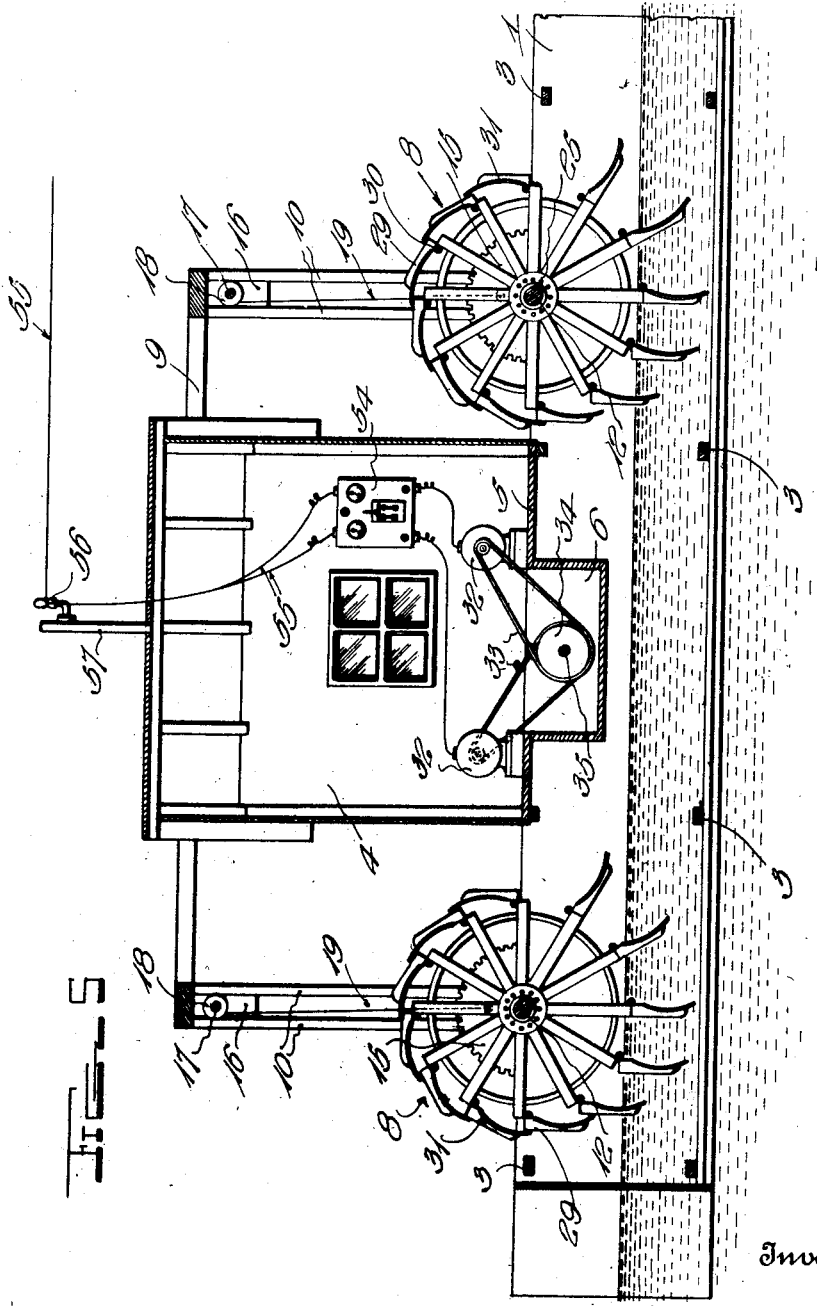
Inventor
G. M. Kievlan
By H. B. Wilson & Co.
Attorneys

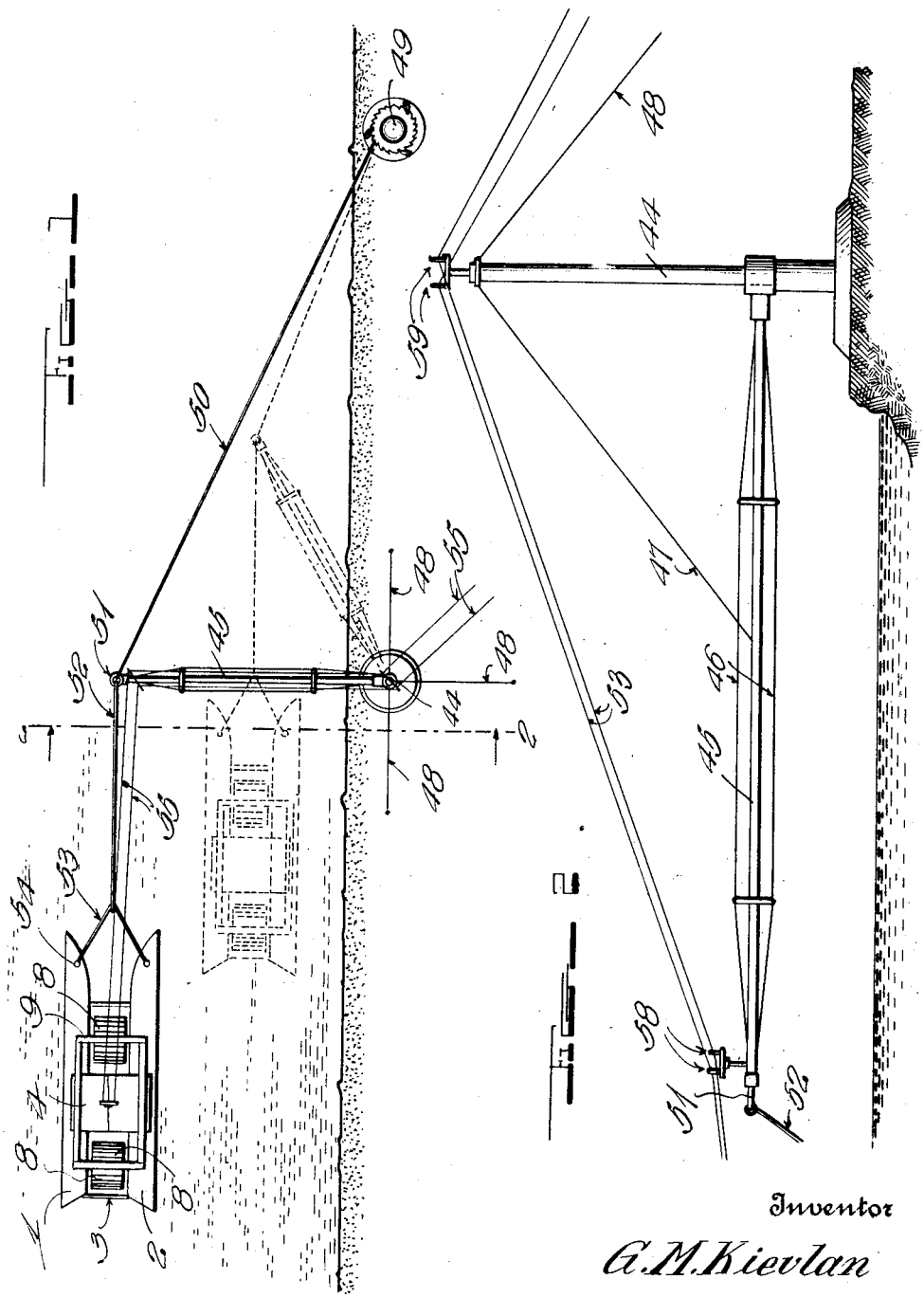

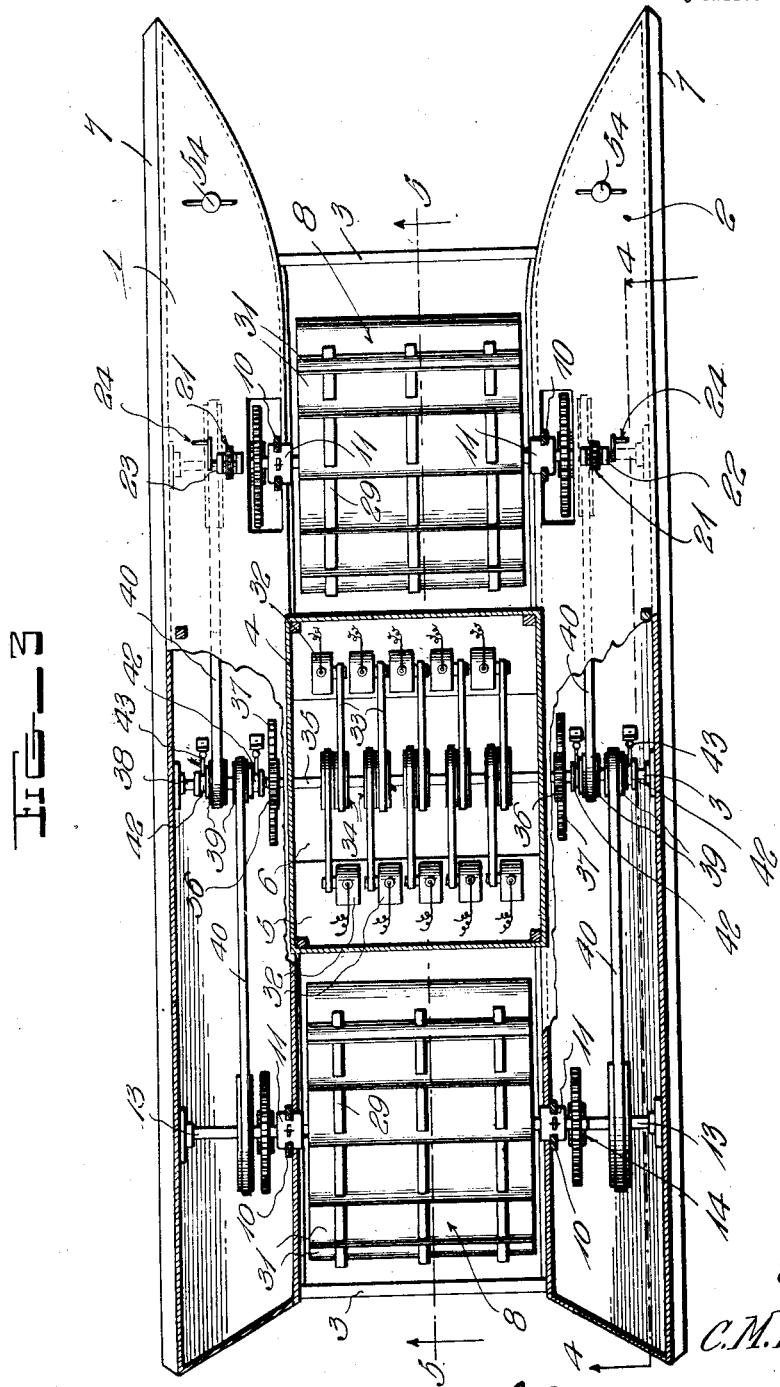

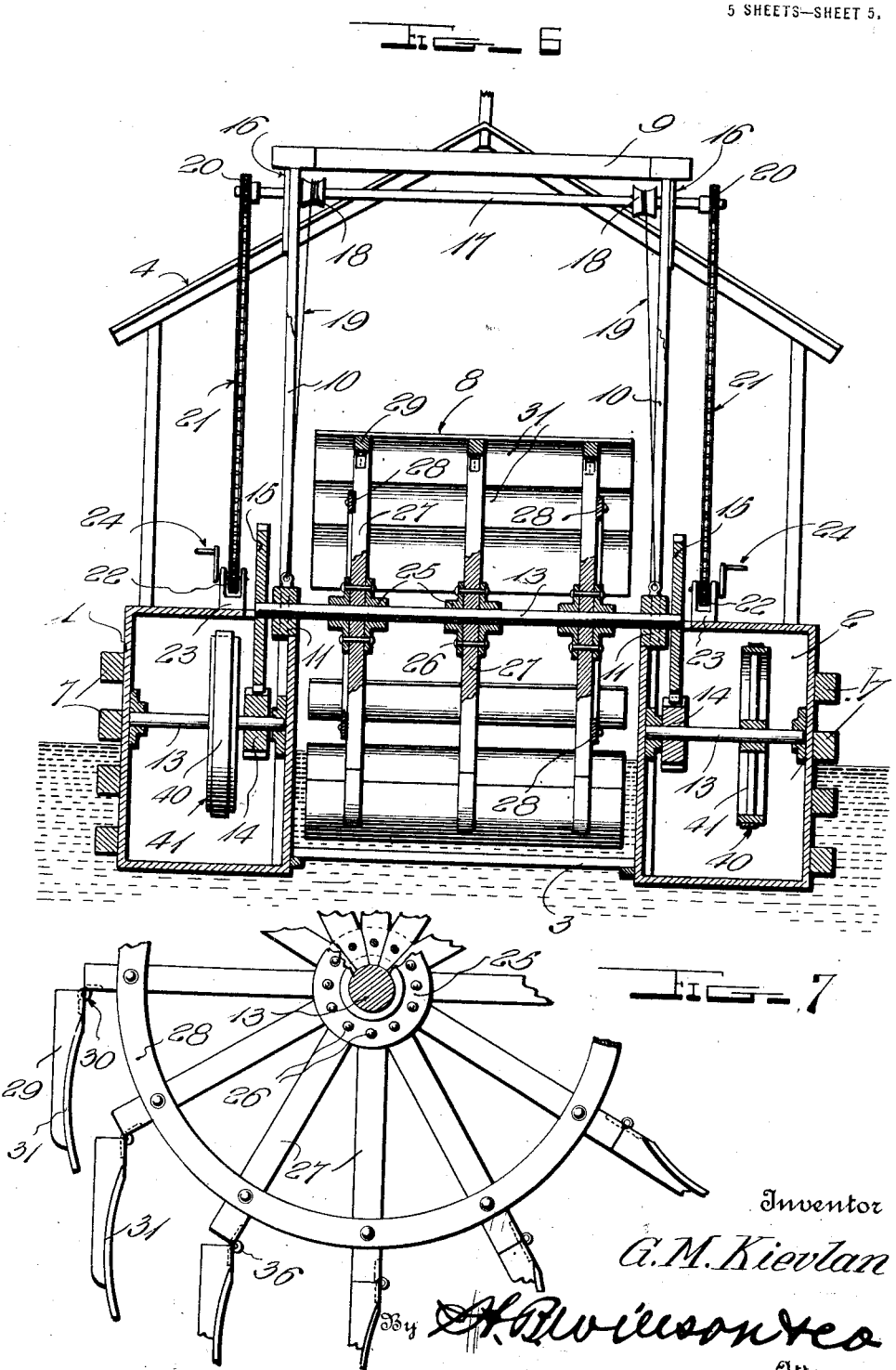

UNITED STATES PATENT OFFICE.

GEORGE MICHAL KIEVLAN, OF KANSAS CITY, MISSOURI.

CURRENT MOTOR.

1,406,031.   Specification of Letters Patent.   Patented Feb. 7, 1922.

Application filed November 8, 1920. Serial No. 422,614.

*To all whom it may concern:*

Be it known that I, GEORGE M. KIEVLAN, a citizen of the United States, residing at Kansas City, in the county of Jackson and State of Missouri, have invented certain new and useful Improvements in Current Motors; and I do declare the following to be a full, clear, and exact description of the invention, such as will enable others skilled in the art to which it appertains to make and use the same.

This invention relates to an improved current motor of the general type in which a power house is mounted upon floats, the power house having generators mounted therein and operated from a driven shaft extending between the floats and through a sink or box beneath the house and between the floats and the driven shaft being operated from paddle wheels which are mounted for rotation by the current of the stream in which the structure floats.

One object of the invention is to so mount the paddle wheels that they may be vertically adjusted and moved into and out of the water thus permitting the wheels to be selectively lowered to an operative position or moved upwardly to an inoperative position where necessary repairs may be made to one of the paddle wheels while the second is still in operation.

Another object of the invention is to so mount the paddle wheels that gears carried by the shafts thereof may engage gears of driving shafts in the floats when the paddle wheels are in a lowered or operative position.

Another object of the invention is to so construct this device that the shafts and pulley wheels for transmitting rotary movement from the paddle wheel shafts to the driven shaft may be mounted within the floats where they will be protected from exposure and to further provide certain of these pulley wheels with clutches so that they may be released and run idle when so desired.

Another object of the invention is to provide improved means for moving the bearings of the paddle wheels and releasably holding the bearings in adjusted position with the paddle wheels in a raised or lowered position.

This invention is illustrated in the accompanying drawings, wherein:

Figure 1 is a view in top plan showing the current motor in use, the dotted line position showing the device drawn in towards the bank of the stream to permit a boat to pass up or down the stream without being interfered with by the motor.

Figure 2 is a sectional view taken along the line 2—2 of Fig. 1.

Figure 3 is an enlarged view showing the current motor partially in top plan and partially broken away and shown in longitudinal section.

Figure 4 is a sectional view taken along the line 4—4 of Fig. 3.

Figure 5 is a longitudinal sectional view taken along the line 5—5 of Fig. 3.

Figure 6 is a transverse sectional view taken along the line 6—6 of Fig. 4.

Figure 7 is an enlarged fragmentary view of one of the paddle wheels.

This improved current motor is provided with spaced floats 1 and 2 which are held in spaced relation by the cross bars 3, the cross bars extending between the floats as shown in Figs. 3 and 5 so that the floats will be firmly braced and prevented from moving out of the parallel relation shown. The forward end portions of the floats are flared outwardly as shown in Fig. 3 so that the water which passes between the floats will be forced to pass through a restricted passage and thus the water pressure increased and the paddle wheels more readily rotated. These floats carry a power house 4 which bridges the space between the floats and has its floor 5 provided with an opening for communication with a sink or box 6 positioned between the floats as shown in Fig. 5. Bumper strips 7 are provided at the outer sides of the floats so that the motor may be drawn along the side of a dock without danger of the floats being damaged.

In order to rotatably and adjustably mount the paddle wheels 8, there has been provided a frame 9 which includes vertical standards 10 which provide tracks to slidably mount the bearings 11 in which the shafts 12 of the paddle wheels are rotatably mounted. Short driving shafts 13 are mounted in the floats or pontoons and carry small gear wheels 14 which are engaged by the large gear wheels 15 carried by the paddle wheel shafts when the paddle wheels are in a lowered or operative position. Since the bearings are slidably mounted for vertical movement, it will be readily seen that when the paddle wheels are raised by movement of the bearings along the tracks or standards 10, the gears 15 will be moved out of engagement with the gears 14. In order to permit the bearings to be moved vertically and supported in a vertically adjusted position, the standards at each end of the floats have been provided with bearings 16 to rotatably mount a drum shaft 17. The shaft 17 carries drums 18 about which are wound cables 19 which are connected with the bearings 11. The shaft 17 at each end of the frame extends out beyond the standard and has its end portions provided with sprocket wheels 20 about which pass sprocket chains 21. These sprocket chains 21 are engaged by sprockets 22 mounted upon shafts journaled in the blocks 23 and provided with crank handles 24 so that the sprockets 22 may be rotated and the shaft 17 thus rotated to permit the paddle wheels to be raised or lowered. By having a sprocket chain engaging each end of the shaft 17, the shaft may be rotated from either side of the frame or in other words from either float and this permits of easy and convenient operation.

The paddle wheels are of a duplicate construction and each is provided with hub plates 25 which fit upon the shafts 13 and carry bolts or rivets 26 which pass through the inner ends of the spokes 27. These spokes 27 are braced and held in the proper radiating relation by the rings 28 and from an inspection of Fig. 7, it will be seen that the spokes extend beyond the rings and have their outer end portions 29 hingedly mounted as shown at 30 so that the spokes may move as the paddle wheel rotates. In other words, the end portions 30 of the spokes which carry the blades 31 may move from an extended position with the outer end portions of the spokes in alignment with the inner end portions and contacting therewith to a position at substantially right angles to the inner end portions of the spokes. Therefore, as the wheels rotate the paddle wheels may be engaged by the water and as the blades move out of the water, the outer end portions of the spokes may drop to permit the blades to be drawn vertically out of the water instead of with an upward horizontal sweep which would cause back pressure.

The generators 32 are mounted in the power house upon opposite sides of the box or sink 6 and are operated by belts 33 which pass about pulley wheels 34 mounted upon a driven shaft 35 which extends through the box 6 and has its end portions extending into the floats 1 and 2. The driven shaft carries gear wheels 36 which mesh with larger gear wheels 37 mounted upon countershafts 38 which are rotatably mounted in the floats and carry pulley wheels 39 about which pass belts 40 which transmit rotary movement from the driving shafts 13 through the medium of pulley wheels 41 carried by the shafts 13. The pulley wheels 39 fit loosely upon the shafts 38 and the shafts 38 carry clutches 42 having actuating levers 43 by means of which the clutches may be moved into and out of operative engagement with the pulley wheels. It will thus be seen that the pulley wheels can be released or locked upon the shafts and permitted to operate to rotate the shafts or permitted to run idle upon the shafts. By this arrangement, the driving shafts can be rotated from a single paddle wheel or both of the paddle wheels may be operatively connected with the driven shaft.

When the device is in use, it is intended to have the structure positioned in the stream and at a distance from the shore as shown in Fig. 1 and it is further desired to permit the device to be drawn in close to the shore in order to permit a boat to pass up the stream without being interfered with by the power plant. A mast 44 will therefore be erected close to the stream and a boom 45 mounted upon the mast 44. This boom will be suitably braced as shown at 46 and a truss cable 47 will be provided to prevent the boom from breaking off at its connection with the mast. This mast will be braced by guy wires or cables 48 so that it will be retained in an upright position. A winding drum 49 is provided at a convenient point and a cable 50 is wound upon this drum and connected with the eye 51 at the outer end of the boom so that the boom can be drawn from the position shown in full lines of Fig. 1 to that indicated by the dotted lines. The eye 51 in addition to being engaged by the cable 50 is engaged by a cable or tow line 52 which in its turn is connected with a bridle 53 connected with the bits 54 carried by the floats 1 and 2. It will thus be seen that when it is desired to draw the power plant towards the shore, it is simply necessary to wind this cable 50 upon the drum 49 and draw the boom inwardly so that the boom and power plant will assume the position indicated by dotted lines. When it is desired to have the power plant moved out into the stream where the current is strongest, the drum will be rotated to unwind the cable 50 and the boom will swing out to the position shown by full lines. Power wires 55 lead from the board 54 and are carried from the insulators 56 mounted upon the mast or pole 57 to the insulators 58 at the free end of the boom and from the insulators 58 to the insulators 59 at the top of the mast from which they will lead to a point where the electric power developed is to be stored. It will thus be seen that the device is so constructed that one or both of the paddle wheels may be put in operation or held in a raised position in which the wheels will be held out of operation.

I claim:

1. A water power structure comprising spaced floats, a power house carried thereby and bridging the space between the floats, a box carried by said power house and extending into the space between the floats, a driven shaft extending through the box into said floats, generators in said power house having operative connection with said driven shaft, vertical tracks carried by said floats in front of and to the rear of said power house, bearings slidably carried by said tracks, paddle wheels positioned between said floats and having shafts journaled in said bearings, counter shafts in said floats having geared connection with said driven shaft, driving shafts in said floats having operative connection with said counter shafts, gears carried by said driving shafts and the shafts of said paddle wheels, and means for vertically adjusting said bearings and retaining the paddle wheels in adjusted positions.

2. A water power structure comprising spaced floats, vertical tracks carried by said floats, bearings slidable upon said tracks, paddle wheels between the floats having shafts journaled in said bearings, driving shafts rotatably carried by said floats, co-operating gears carried by the driving shafts and paddle wheel shafts, winding shafts carried by said tracks, cables wound about the winding shafts and connected with said bearings for vertically adjusting the bearings and paddle wheels, energy transforming means and means for transmitting rotary movement from the driving shafts to the energy transforming means.

3. A water power structure comprising spaced floats, bearings mounted for vertical adjustment, paddle wheels between said floats having shafts journaled in said bearings, means for vertically adjusting the bearings and retaining the same in adjusted positions, driving shafts rotated from the paddle wheel shafts when the paddle wheels are in a lowered position, energy transforming means, and means for transmitting rotary movement from the driving shafts to the energy transforming means.

4. A water power structure comprising spaced floats, a driven shaft extending between the floats with its end portions extending into the same, paddle wheels between said floats each having a shaft having extended end portions, driving shafts rotatably mounted in the floats, bearings for the paddle wheel shafts mounted for vertical adjustment whereby the paddle wheels may be moved into and out of an operative position, means for transmitting rotary movement from the paddle wheel shafts to the driving shaft when the paddle wheels are in an operative position, and means for transmitting rotary movement from the driving shafts to the driven shaft including clutch elements controlling rotation of the driven shaft from the separate driving shafts.

5. A water power structure comprising float means, bearings mounted for vertical movement, a paddle wheel having a shaft journaled in said bearings, means for vertically adjusting the bearings and retaining the bearings in the adjusted position, and a driving shaft rotatably mounted and rotated from the paddle wheel when the paddle wheel is lowered.

6. A water power structure comprising spaced floats, a driven shaft including means for transmitting rotary movement from the same, driving shafts rotatably carried by said floats, intermediate shafts rotatably carried by said floats, and having operative connection with said driven shaft, pulleys and clutches for the pulleys carried by said intermediate shafts, pulley wheels carried by the driving shafts, and paddle wheels mounted for rotary movement and movement into and out of operative relation to the driving shafts.

7. A water power structure comprising a float structure, a driven shaft, and means for imparting rotary movement to the driven shaft including a driving shaft, a paddle wheel including a shaft, bearings for the paddle wheel shaft movable towards and away from the driving shaft, and co-operating gears carried by the driving shaft and paddle wheel shaft.

In testimony whereof I have hereunto set my hand in the presence of two subscribing witnesses.

GEORGE MICHAL KIEVLAN.